United States Patent
Park et al.

(10) Patent No.: US 11,078,742 B2
(45) Date of Patent: Aug. 3, 2021

(54) BOP HEALTH MONITORING SYSTEM AND METHOD

(71) Applicant: Cameron International Corporation, Houston, TX (US)

(72) Inventors: Se Un Park, Quincy, MA (US); Rajesh Kumar Bade, Houston, TX (US); Daniel Barker, Houston, TX (US); Daniel Edgardo Viassolo, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 269 days.

(21) Appl. No.: 16/410,969

(22) Filed: May 13, 2019

(65) Prior Publication Data
US 2019/0345788 A1  Nov. 14, 2019

Related U.S. Application Data

(60) Provisional application No. 62/670,838, filed on May 13, 2018.

(51) Int. Cl.
*E21B 33/06* (2006.01)
*G01M 13/003* (2019.01)
*E21B 47/06* (2012.01)

(52) U.S. Cl.
CPC ............ *E21B 33/061* (2013.01); *E21B 47/06* (2013.01); *G01M 13/003* (2019.01)

(58) Field of Classification Search
CPC .... F15B 19/005; F16J 15/3296; F16J 15/3494
See application file for complete search history.

(56) References Cited

U.S. PATENT DOCUMENTS

| 7,124,057 B2* | 10/2006 | Forster | F15B 19/005 702/183 |
| 8,138,931 B2* | 3/2012 | Keast | F15B 19/005 340/603 |
| 8,874,307 B2* | 10/2014 | Behr | F15B 19/005 701/32.1 |
| 9,410,392 B2* | 8/2016 | Jaffrey | E21B 47/07 |

(Continued)

OTHER PUBLICATIONS

Se Un Park et al., "Towards Automated Condition Monitoring of Blowout Preventer Wellbore Packers", Annual Conference of the Prognostics and Health Management Society, 2018. (Year: 2018).*

(Continued)

*Primary Examiner* — David A. Rogers

(57) ABSTRACT

A blowout preventer (BOP) health monitoring system includes a controller having a tangible, machine readable-medium storing one or more instructions executable by a processor. The one or more instructions are configured to receive feedback from a sensor, where the feedback is indicative of a pressure within a BOP stack over time, determine a position of a plurality of components of the BOP stack, determine a start point and an end point of a pressure test based on the feedback, determine a decay and a hold duration of the pressure test based on the feedback, the start point, and the end point, determine a health index of the BOP stack based on the decay and the hold duration, and provide an output indicative of a condition of the BOP stack based on the health index.

20 Claims, 7 Drawing Sheets

(56) References Cited

U.S. PATENT DOCUMENTS

| | | | | |
|---|---|---|---|---|
| 9,677,573 | B2* | 6/2017 | Jaffrey | F15B 15/2815 |
| 10,024,754 | B2* | 7/2018 | Hervieux | F16J 15/3492 |
| 10,087,745 | B2* | 10/2018 | Gottlieb | E21B 47/095 |
| 10,287,869 | B2* | 5/2019 | Jaffrey | E21B 33/064 |
| 10,467,881 | B2* | 11/2019 | Chen | G01K 13/02 |
| 10,570,689 | B2* | 2/2020 | Jaffrey | E21B 33/0355 |
| 10,585,068 | B2* | 3/2020 | Gottlieb | G01N 29/024 |
| 10,724,307 | B2* | 7/2020 | Bushman | E21B 33/085 |
| 10,751,950 | B2* | 8/2020 | Donaldson | B29C 65/20 |
| 10,900,347 | B2* | 1/2021 | Amsellem | E21B 47/117 |
| 2003/0005486 | A1* | 1/2003 | Ridolfo | G05B 23/0272 800/288 |
| 2003/0216888 | A1* | 11/2003 | Ridolfo | G05B 23/0283 702/181 |
| 2014/0064029 | A1* | 3/2014 | Jaffrey | E21B 33/062 367/81 |
| 2014/0069531 | A1* | 3/2014 | Jaffrey | E21B 33/076 137/553 |
| 2014/0123746 | A1* | 5/2014 | Jaffrey | E21B 33/0355 73/152.18 |
| 2015/0233398 | A1* | 8/2015 | Jaffrey | E21B 33/064 92/5 R |
| 2015/0308253 | A1* | 10/2015 | Clark | E21B 44/00 175/24 |
| 2015/0337599 | A1* | 11/2015 | Bullock | E21B 21/08 175/24 |
| 2016/0131692 | A1* | 5/2016 | Jaffrey | G01R 31/1272 324/544 |
| 2016/0215608 | A1* | 7/2016 | Jaffrey | E21B 33/064 |
| 2016/0237773 | A1* | 8/2016 | Dalton | G05B 23/0283 |
| 2016/0341628 | A1* | 11/2016 | Hervieux | F16J 15/445 |
| 2017/0130575 | A1* | 5/2017 | Jaffrey | E21B 33/06 |
| 2017/0152967 | A1* | 6/2017 | Jaffrey | E21B 33/063 |
| 2018/0135379 | A1* | 5/2018 | Bushman | E21B 17/01 |
| 2018/0142543 | A1* | 5/2018 | Gupta | E21B 33/0355 |
| 2019/0011051 | A1* | 1/2019 | Yeung | F04B 47/04 |
| 2019/0017344 | A1* | 1/2019 | Lambert | E21B 33/0375 |
| 2019/0226295 | A1* | 7/2019 | Zonoz | E21B 33/038 |
| 2019/0271225 | A1* | 9/2019 | Amsellem | E21B 33/06 |
| 2019/0278260 | A1* | 9/2019 | Dalton | E21B 34/16 |
| 2020/0096132 | A1* | 3/2020 | Fassbender | F16K 37/0041 |

OTHER PUBLICATIONS

Canh Ly et al., "Fault Diagnosis and Failure Prognosis for Engineering Systems: A Global Perspective", 5th Annual IEEE Conference on Automation Science and Engineering Bangalore, India, Aug. 22-25, 2009. (Year: 2009).*

Taimoor S. Khawaja et al., "An Efficient Novelty Detector for Online Fault Diagnosis based on Least Squares Support Vector Machines", IEEE AUTOTESTCON 2008, Salt Lake City, UT, Sep. 8-11, 2008. (Year: 2008).*

Ahmed Mosallam, "Data Driven PHM Applications for Oil & Gas Industry", Schlumberger Research & Production Center, 2019. (Year: 2019).*

International Standards Organization (ISO), "Condition Monitoring and Diagnostics of Machines—Prognostics part 1: General Guidelines," 15013381-1, 2004 (e), vol. ISO/IEC Directives Part 2, I. O. f. S. (ISO), Genève, Switzerland, International Standards Organization, Jun. 11, 2004.

Schwabacher, et al., "A survey of artificial intelligence for prognostics," Proceedings of AAAI Fall Symposium, Nov. 9-11, 2007, Arlington, VA.

* cited by examiner

EXAMPLE PRESSURE TEST SETUP CONFIGURATION

| COMPONENT | VALVE STATE (0=OPEN, 1=CLOSED) |
|---|---|
| ANNULAR BOP | 1 |
| 2ND SHEAR RAM | 0 |
| 1ST SHEAR RAM | 0 |
| 3RD PIPE RAM | 0 |
| 2ND PIPE RAM | 0 |
| 1ST PIPE RAM | 0 |
| UPPER OUTER CHOKE (UOC) | 1 |
| UPPER INNER CHOKE (UIC) | 0 |
| LOWER OUTER CHOKE (LOC) | 1 |
| LOWER INNER CHOKE (LIC) | 0 |
| CHOKE ISOLATION VALVE (CIV) | 0 |
| UPPER OUTER KILL (UOK) | 0 |
| UPPER INNER KILL (UIK) | 0 |
| LOWER OUTER KILL (LOK) | 0 |
| LOWER INNER KILL (LIK) | 0 |
| KILL ISOLATION VALVE (KIV) | 0 |
| OUTER GAS BLEED VALVE (OB) | 1 |
| INNER GAS BLEED VALVE (IB) | 0 |
| MUD BOOST VALVE | 1 |

FIG. 5

BOP HEALTH MONITORING SYSTEM AND METHOD

CROSS REFERENCE TO RELATED APPLICATIONS

This is a non-provisional patent application of co-pending U.S. Provisional Patent Application Ser. No. 62/670,838, filed on May 13, 2018 which is hereby incorporated in its entirety for all intents and purposes by this reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A blowout preventer (BOP) is a component that is designed to be placed on top of a wellhead of a mineral extraction system. The BOP may be activated to block a flow of fluid from a wellbore toward a platform or rig of the mineral extraction system. For example, the BOP may be activated by directing hydraulically energized packer elements or rams that form a seal between the wellbore and the wellhead. Periodic testing of a BOP may enable operators to maintain and control an integrity of the BOP. For instance, a pressure test may simulate a 'kick' (e.g., an increase in wellbore pressure) to assess an ability of BOP packers or rams to isolate the well pressure from the wellhead and/or the platform. The pressure tests may be formed at periodic intervals to determine the integrity of the BOP components. High pressure fluid used during the pressure test may cause various components (e.g., pipes, conduits, packers, rams, and/or elastomeric components) to incur wear, which may affect a performance of the BOP. During the pressure test, the drilling and/or production processes of the mineral extraction system may be shut down or otherwise stopped. For instance, during the pressure test, components of the BOP may be closed to apply pressure to the BOP and measure the pressure changes at various sensors to determine that the BOP can hold the specified pressure. Unfortunately, existing testing methods may be time consuming, which may reduce production of the mineral extraction system.

SUMMARY

In an embodiment, a blowout preventer (BOP) health monitoring system includes a controller having a tangible, machine readable-medium storing one or more instructions executable by a processor. The one or more instructions are configured to receive feedback from a sensor, where the feedback is indicative of a pressure within a BOP stack over time, determine a position of a plurality of components of the BOP stack, determine a start point and an end point of a pressure test based on the feedback, determine a decay and a hold duration of the pressure test based on the feedback, the start point, and the end point, determine a health index of the BOP stack based on the decay and the hold duration, and provide an output indicative of a condition of the BOP stack based on the health index.

In another embodiment, a system includes a blowout preventer (BOP) stack having one or more valves and a BOP, a sensor configured to monitor a pressure within the BOP stack, and a BOP health monitoring system having a controller with a tangible, machine readable-medium storing one or more instructions executable by a processor. The one or more instructions are configured to receive feedback from the sensor, where the feedback is indicative of a pressure within the BOP stack over time, determine a start point and an end point of a pressure test based on the feedback, determine a decay and a hold duration of the pressure test based on the feedback, the start point, and the end point, determine a health index of the BOP stack based on the decay and the hold duration, and provide an output indicative of a condition of the BOP stack based on the health index.

In another embodiment, a method includes receiving feedback from a sensor indicative of a pressure within a BOP stack over time, determining a start point and an end point of a pressure test based on the feedback, determining a decay and a hold duration of the pressure test based on the feedback, the start point, and the end point, determining a health index of the BOP stack based on the decay and the hold duration, and providing an output indicative of a condition of the BOP stack based on the health index.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 5 is a table illustrating an example of an embodiment of a pressure test configuration for the BOP system of FIG. 4, in accordance with an embodiment of the present disclosure;

DETAILED DESCRIPTION OF SPECIFIC EMBODIMENTS

Figure 1:
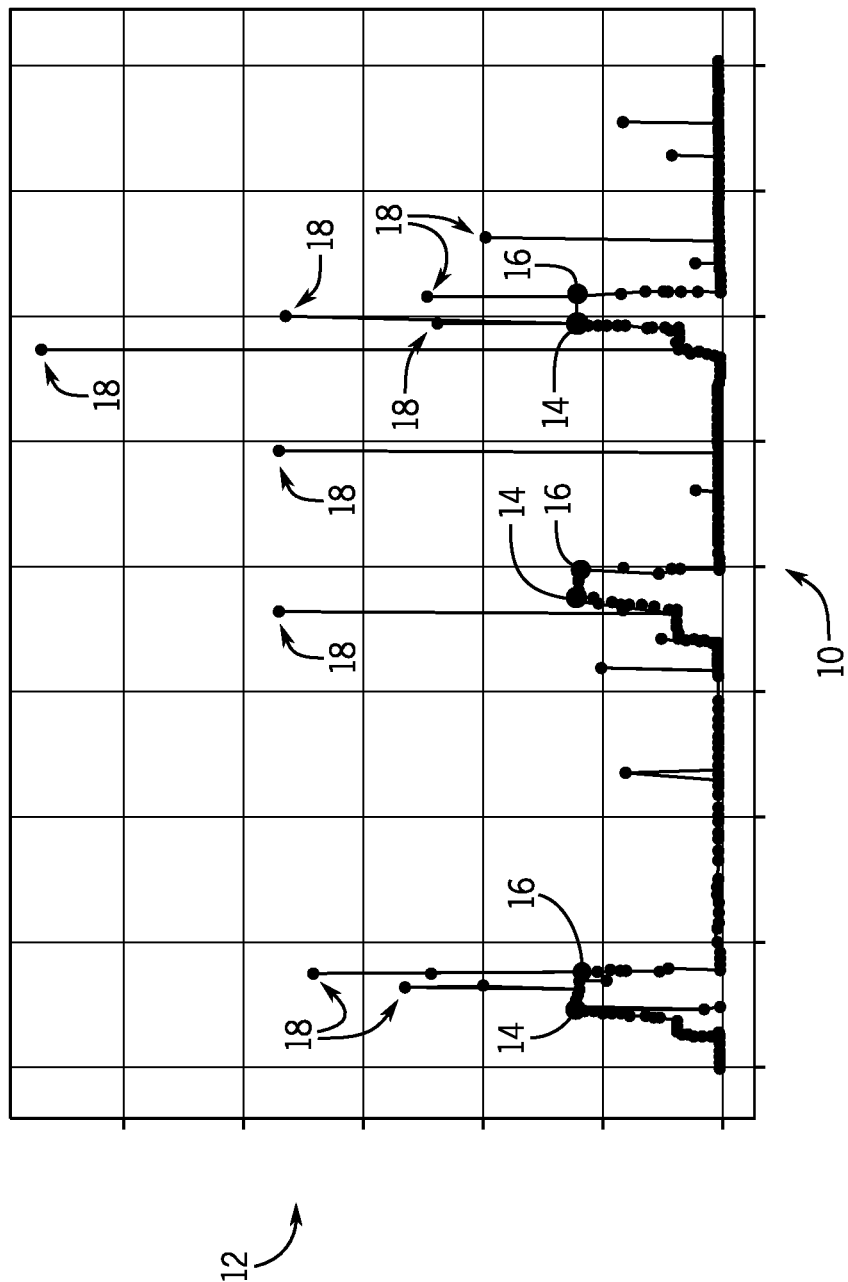
FIG. 1 is a graphical representation of an embodiment of results produced by an improved blowout preventer (BOP) health monitoring system, in accordance with an embodiment of the present disclosure.

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, components, have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

The present disclosure relates to systems and methods for monitoring the health of blowout preventer (BOP) stacks in mineral extraction systems. As used herein, a BOP stack may refer to a system that includes one or more BOPs positioned above a wellhead, one or more valves, one or more fluid conduits, other suitable components, or any combination thereof. Specifically, the present disclosure relates to a BOP health monitoring system (e.g., a signal-based monitoring system) that uses pressure test data and related system data in order to determine a health of a BOP stack and/or components of the BOP stack (e.g., packers, elastomeric components, rams, valves, among others). In some embodiments, the BOP health monitoring system further uses underlying physics of the BOP stack to determine to the health of the BOP stack.

The BOP health monitoring system may include a controller or another suitable computing device that includes a processor and a memory device. The processor may be utilized to execute instructions stored on the memory device and may include a general purpose processor, a special purpose processor, one or more application specific integrated circuits (ASICS), and/or a combination thereof. In some embodiments, the processor includes a reduced instruction set processor. The memory may include volatile memory, such as random access memory (RAM), and/or nonvolatile memory, such as read-only memory (ROM). The memory device stores processor-executable instructions that may be utilized to receive feedback from one or more sensors, analyze the feedback, determine various test configurations, determine a health index of the BOP stack, determine a health index of one or more specific components of the BOP stack, and/or perform other functions described herein.

According to some embodiments, the BOP health monitoring system utilizes a prognostic health monitoring (PHM) algorithm that monitors and/or analyzes pressure test data. For example, pressure test data may include feedback indicative of a pressure of a fluid within the BOP stack and/or at the wellbore over time. In some embodiments, the BOP health monitoring system is configured to identify and characterize pressure tests by searching start and end points of pressure test data when considering physical constraints of a given BOP stack (e.g., a number of components that may be tested, a pressure threshold of tested components, a duration at which components may maintain a pressure, among others). Further, the BOP health monitoring system may be configured to infer a status of one or more BOP components based on analysis of the pressure test data.

A BOP stack might comprise numerous components, such as annular BOPs, ram BOPs, connectors, conduits, and/or gate-valves. Furthermore, pressure tests of the BOP components may be performed on various combinations of pressure-holding components of the BOP (e.g., packers, rams, and/or valves) in a closed position. For example, a pressurized line may have multiple valves (e.g., inner and/or outer valves, upper, middle, and/or lower valves) and each valve may include one or more inlets and/or outlets, which may be tested to determine the status of subcomponents of the valves (e.g., a first side of a choke valve and/or a second side of a choke valve). Also, pressure tests may be configured to test annular BOPs and/or ram BOPs, which may experience pressure resistance in a single direction (i.e., pressure coming from the wellbore). Embodiments of the present disclosure provide systems and methods that enable identification of which components of a BOP stack are under a pressure test and efficiently perform pressure tests by testing each component while avoiding redundant pressure tests. Accordingly, as pressure testing often limits operational and/or production activities of the mineral extraction system, test plan optimization may minimize non-productive time of the mineral extraction system.

In embodiments of the disclosure, the BOP health monitoring system is configured to monitor a health of BOP stacks in mineral extraction systems using automated testing techniques. The BOP health monitoring system is configured to perform feature extraction of pressure test data based on a simulation model. For example, the BOP health monitoring system may utilize the simulation model to automatically identify components tested, while detecting characteristic data points in time-series pressure measurements. Further, the BOP health monitoring system is configured to evaluate the features and/or characteristic data points, such as pressure decay and/or hold durations, to determine the health of the BOP stack and/or specific BOP components. In some embodiments, the extracted features are further processed in subsequent steps and augmented with existing BOP data to produce health indices (H/s) of the BOP system as an output.

Further still, the BOP health monitoring system is configured to design and simulate BOP pressure test plans with different configurations of components that are included in a given BOP structure. For instance, the BOP health monitoring system may be configured to automatically identify components undergoing a test, select test scenarios, and optimize future pressure test plans. The BOP health monitoring system enables automatic identification of tested components as well as automated test planning using a specific configuration of a BOP stack, constraints of BOP components, and/or known test plans. Using known states of BOP components, the BOP health monitoring system can determine lines and cavities that are pressurized, components tested and/or undergoing testing, pressurized sides of tested components, and components whose status is irrelevant (e.g., components that may not be tested and/or do not require testing). As such, the BOP health monitoring system discussed herein can be used in automating pressure test planning.

In some embodiments, a given BOP stack may include two P/T (pressure and temperature) sensors. In other embodiments, the BOP stack may include one P/T sensor or more than two P/T sensors. In still further embodiments, the BOP stack may include any suitable number P/T sensors and/or another type of sensor. In any case, a number of sensors included in the BOP may be based on the structure and/or a number of components of the BOP stack. In some embodiments, a first sensor may be positioned in and/or proximate to a pipe ram cavity or a shear ram cavity above a wellhead connector to provide wellbore pressure data. Additionally or alternatively, a second sensor may be located along a choke line and/or a kill line. Wellbore pressure data may be indicative of a pressure applied to packers and/or rams of the BOP stack because of the proximity of such components to the wellbore (e.g., see FIG. 4). In some embodiments, the BOP health monitoring system of the present disclosure processes the wellbore pressure data in order to determine a health of the BOP stack and/or components of the BOP stack.

FIG. 1 is a graphical representation of an embodiment of noisy pressure data (e.g., received by a controller of the BOP health monitoring system) with discontinuous pressure values and noise, where time 10 (e.g., measured in minutes) is represented by the x-axis, and pressure 12 (e.g., measured in bars) is represented by the y-axis. As shown in FIG. 1, points 14 indicate a start of a respective pressure test and points 16 indicate an end of the respective pressure tests. A decay level may be determined based on a slope and/or a difference between points 14 and points 16 for each respective pressure test. As is described in detail herein, the decay level of each pressure test may be used as a characteristic feature by the BOP health monitoring system.

As shown in the illustrated embodiment of FIG. 1, the pressure data is recorded at various times, but several pressure data points 18 may be considered as noise, extraneous data, or even erroneous. Some of these data points 18 can be easily removed when performing analysis on the pressure test data. For example, negative pressure values or pressure values greater than a maximum working pressure of the BOP may be considered erroneous and automatically eliminated from the pressure test data. Other data points 18 may be treated as noise and may be filtered using a suitable de-noising technique.

Existing pressure data analysis presents complexities based on resolution of the decay levels, sampling intervals, and/or a combination of both. In particular, P/T sensors may include a data compression mechanism and/or an associated data-historian, which may result in sparse datasets that cause irregular sampling intervals between data points. Additionally, pressure tests that exhibit relatively small differential pressures cause graphs to look flat, thereby leading to sparse data sets. Evaluating small pressure drops and/or irregular sample time-series data may be complex to analyze using existing techniques.

In embodiments of the present disclosure, the BOP health monitoring system may be configured to resample and/or interpolate such data for further processing. For example, the BOP health monitoring system may be configured to employ signal processing techniques such as linear interpolations, bicubic interpolations, radial basis functions, and/or other suitable techniques to effectively analyze small pressure drops and/or irregular sample time-series data. Additionally, resampling may be performed over a given sampling interval after interpolation is applied. In embodiments of the present disclosure, both time domain and frequency domain post-processing algorithms may be considered for extracting informative features. Further still, the BOP health monitoring system may utilize statistical analysis to extrapolate pressure test data.

The characteristic points of pressure tests might include the points 14 and the points 16. As shown in the illustrated embodiments of FIGS. 1 and 2, a pressure test pattern is approximately rectangular. This pattern has a seemingly flat top, but in fact has a small negative slope during the pressure tests. The transitions of either pressure rise or pressure drop applied during the pressure tests are sudden and can be seen as vertical lines over time 10, as seen in FIGS. 1 and 2.

In an embodiment of the present disclosure, by limiting the pressure test pattern to rectangular, the first order differentials of the pressure test data, as instantaneous or point-wise slopes, enables characteristic points in the data set to be identified. However, point-wise differentials might be noisy with large variations because of the nature of the noise included within the pressure test data. Therefore, evaluation of the differentials over a larger, fixed period of time may stabilize the value.

Figure 2:
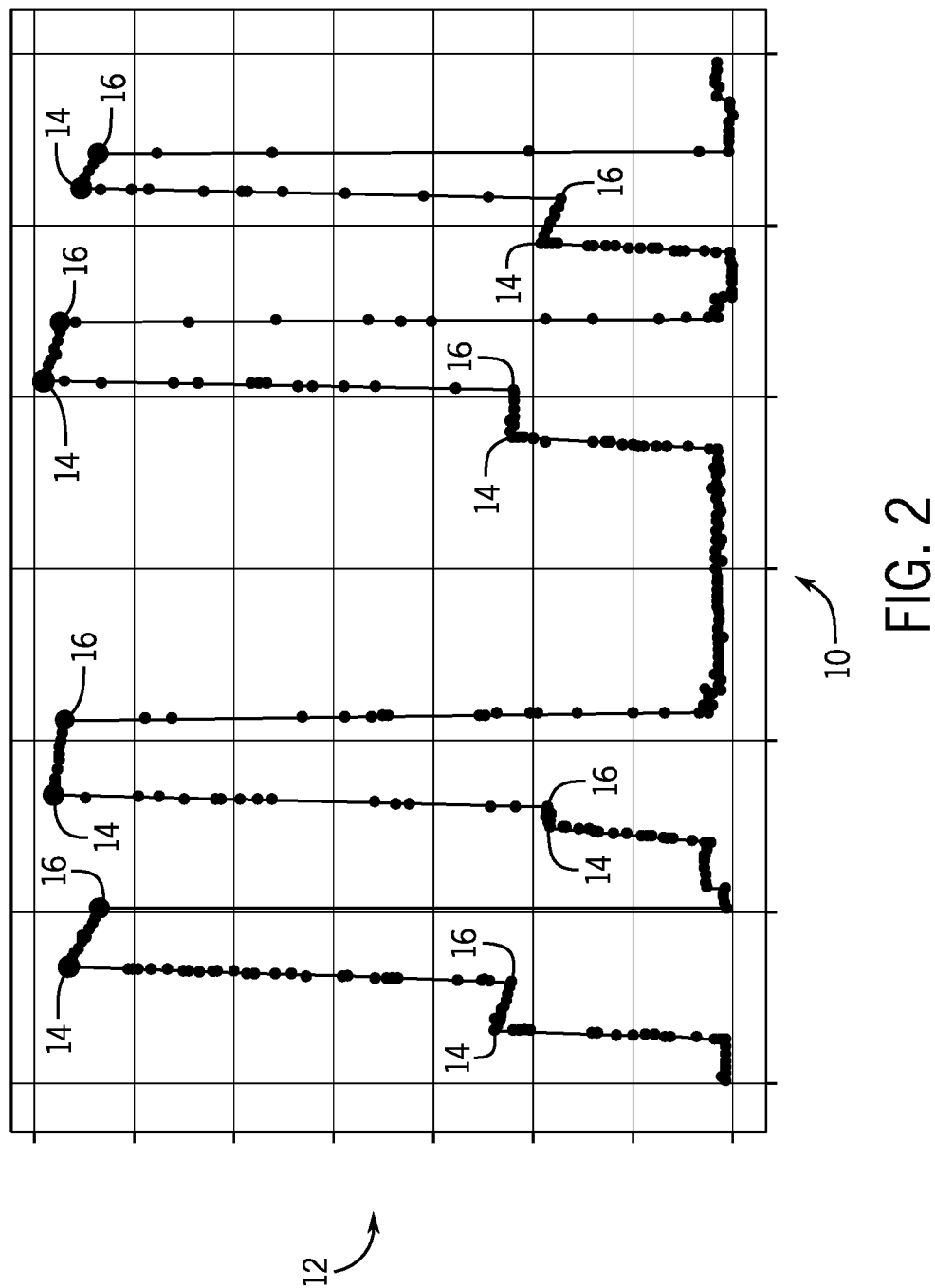
FIG. 2 is a graphical representation of an embodiment of results produced by the improved BOP health monitoring system, in accordance with an embodiment of the present disclosure.

By utilizing differentials over a larger, fixed period of time, identification of the characteristic points in both high pressure (HP) tests and low pressure (LP) tests may be determined, as shown in FIG. 2. Because HP tests may follow the LP tests, the characteristic points of a respective HP test may be determined and then the characteristic points may be determined for the corresponding LP test. In embodiments of the present disclosure, a unit pressure test may be defined as an LP test and an HP test immediately following the corresponding LP test. FIG. 2 presents an example of the detection results similar to FIG. 1, but with less noise and with both HP tests and LP tests. As shown in FIGS. 1 and 2, a typical pressure operation may include multiple individual pressure tests corresponding to a unique BOP Stack configuration.

The American Petroleum Institute (API) issues regulations that may define limits as pass criteria for pressure tests performed on a BOP stack. These limits can include hold-duration between the starting and ending points of pressure tests and global decay (e.g., pressure difference from the ending to the starting points of tests). In embodiments of the BOP health monitoring system disclosed herein, other characteristic features such as local decays defined by specific time-windows, the size of window in terms of time, the number of data points within the window, and statistics (mean, standard deviation) of data points within the window might be used to provide an improved indication of a health of the BOP stack.

For example, in some embodiments, the BOP health monitoring system may be configured to determine the local decay and associated statistics within a moving, size-varying window. As such, the BOP health monitoring system may incrementally extend the window by covering a new data point in the time domain based upon an arbitrary datum, and for each window, repeatedly evaluate the local decay, slope, mean, standard variation, the number of data points within the window, and the window size in time. Other statistics, such as instantaneous slope or point-wise first order differentials, might further be determined by the BOP health monitoring system (e.g., a controller of the BOP health monitoring system).

Based on the above features, embodiments of the disclosure might define health indices based on two algorithms. For example, the BOP health monitoring system may be configured to determine how the pressure test results compare to a target specification using threshold values for decay (e.g., global decay or local decay) and hold duration. Equation 1 below represents the health index for decay (e.g., global decay or local decay) and Equation 2 below represents the health index for hold duration.

$$HI(s)=\max(T_s-s,0)/|T_s| \quad (1)$$

$$HI(d)=\max(T_d-d,0)/d \quad (2)$$

In Equation 1, s represents a decay value (e.g., negative slope in pressure over time or a target time window) and $T_s$ is the threshold for the decay (e.g., slope). In Equation 2, d represents duration time of the pressure hold and $T_d$ is the threshold for the duration time of the pressure hold. The overall health index (HI) is the sum of the decay health index and the duration health index, HI(s) and HI(d), respectively, as shown in Equation 3 below.

$$HI=HI(s)+HI(d) \quad (3)$$

Additionally, in some embodiments, the health index may be generated based on local decay over a target window of time. As such, a standard deviation of the plurality of tests may also be included in the overall health index (HI), as shown in Equation 4 below. In other embodiments, the slope, mean, number of data points within the target window, and/or the window size in time may also be included in the overall health index calculation. In still further embodiments, any weighted combination of individual health indices, such as HI(s), HI(d), HI(std. dev.), etc., may be utilized to generate the overall health index, HI, as shown in Equation 5 below. For example, a first weight, $w_1$, may be assigned to a first health index, $k_1$, a second weight, $w_2$, may be assigned to a second health index, $k_2$, a third weight, $w_3$, may be assigned to a third health index, $k_3$, and so forth. As such, when decay, s, is the first health index, $k_1$, and the first weight, $w_1$, is 1, when hold duration, d, is the second health index, $k_2$, and the second weight, $w_2$, is also 1, and when standard deviation, std. dev., is the third health index, $k_3$, and the third weight, $w_3$, is 0, then Equation 5 may be reduced to Equation 3 set forth above.

$$HI=HI(s)+HI(d)+HI(\text{std. dev.}) \quad (4)$$

$$HI=w_1 HI(k_1)+w_2 HI(k_2)+w_3 HI(k_3)+\ldots \quad (5)$$

Figures 3A, 3B:
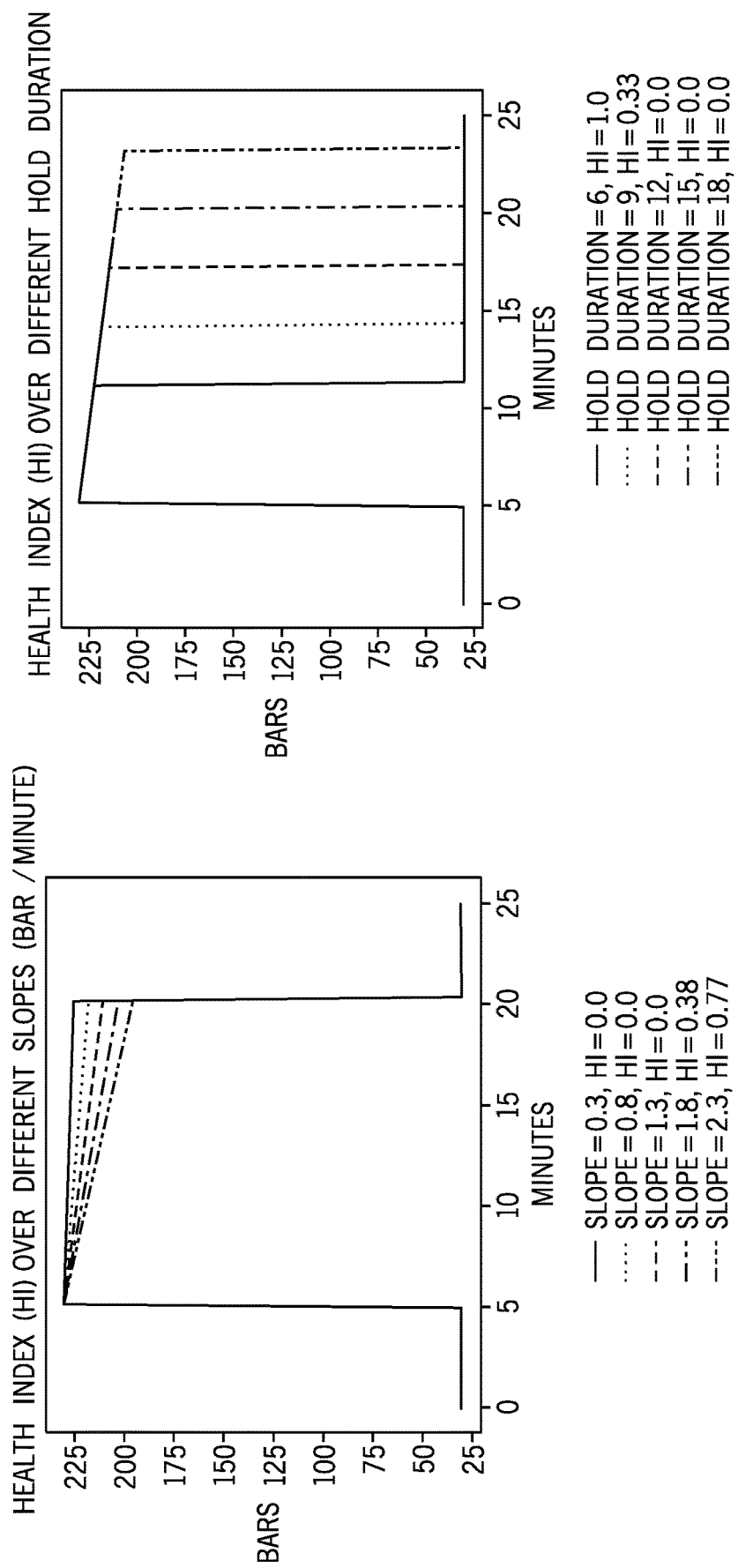
FIGS. 3A and 3B are graphical representations of embodiments of results produced by the improved BOP health monitoring system, in accordance with an embodiment of the present disclosure.

FIGS. 3A and 3B are graphical representations of embodiments of several health indices evaluated from different decays (e.g., global decays or local decays) and hold durations. For example, FIG. 3A represents health indices over different decays, HI(s). FIG. 3B represents health indices over different hold durations, HI(d). In these examples, the decay threshold is 1.3 bar/minute (e.g., absolute values are considered) and the hold duration threshold is 12 minutes. Any other decay threshold and/or hold duration threshold may be used as appropriate for the assessed BOP system. If the absolute value of a decay becomes larger than the threshold, HI increases from zero. If the hold duration is less than the threshold, then the corresponding HI also increases from zero. In the example of FIGS. 3A and 3B, the health index is chosen as zero (0) as the index for "healthy," monotonically increasing to one-hundred (100) for "unhealthy." The choice of starting/ending indexes as well as direction (e.g. monotonically decreasing, increasing, etc.) is however arbitrary and may be amended as appropriate to the tested system.

The threshold values for decay and hold duration may be obtained and/or otherwise retrieved from industrial regulatory guidelines, government agencies, equipment owner's past experience, equipment manufacturer recommendations, and/or industry group practices. In some embodiments, health indices are defined such that for a healthy state, HI=0. The health indices increase as non-negative numbers as the component's health decreases. The healthiest state covers the cases where the hold duration and decay of the pressure hold period are less than the corresponding threshold values. The decays and decay thresholds are expected to be negative as the pressure tends to drop over time during the hold period. In embodiments of the disclosure, the pressure drop can be modeled as either exponential and/or linear. For example, the pressure drop rate is proportional to the difference between the contained high pressure and outside pressure (i.e., dP/dt=$-k$ P(t), where k is a constant, P represents pressure, and t represents time). As such, the pressure may be modeled as exponential decay, P(t)=P0 exp($-$kt), with the initial pressure P0. In some cases, when the pressure drop rate is constant over time due to system control (i.e., dP/dt=$-$k) then the drop is simply linear, P(t)=P0$-$kt.

To reduce costs, every BOP stack component might not be equipped with a pressure sensor. Accordingly, the BOP health monitoring system may be configured to identify which components are being tested during a specific pressure test. For a given BOP structure, one can manually compile all the possible test scenarios before testing and build a dictionary of test configurations that may indicate an open/closed position of each component during a respective pressure test. The dictionary of test configurations may thus be utilized to determine which components are being tested during the respective pressure test. Unfortunately, manually compiling the dictionary of test configurations may become increasingly cumbersome as the number of test configurations increases. Therefore, the BOP health monitoring system of the present disclosure may be configure to automatically generate the dictionary of test configurations. Moreover, the BOP health monitoring system may be configured to determine which components are being tested in real time as tests are performed or offline upon completion of a test. Further still, the BOP health monitoring system may be configured to compare a given test to the automatically generated dictionary of test configurations in order to identify redundancies in a pressure test plan and optimize the pressure test plan. In other words, the BOP health monitoring system may reduce a total number of pressure tests within a target test configuration plan to reduce non-productive time of the mineral extraction system.

In some embodiments, the BOP health monitoring system includes a BOP stack pressure test simulator that defines a state and/or a position of valves, BOPs, and pressure sources of a BOP stack at the time of the pressure test and/or during hold periods of the pressure test. As such, the BOP stack pressure test simulator may be configured to determine which components of the BOP stack are being tested during a given pressure test. The BOP health monitoring system may store this information in the form of a schematic diagram of the BOP stack, a table, a matrix, text string, data, another suitable format, or a combination thereof.

Figure 4:
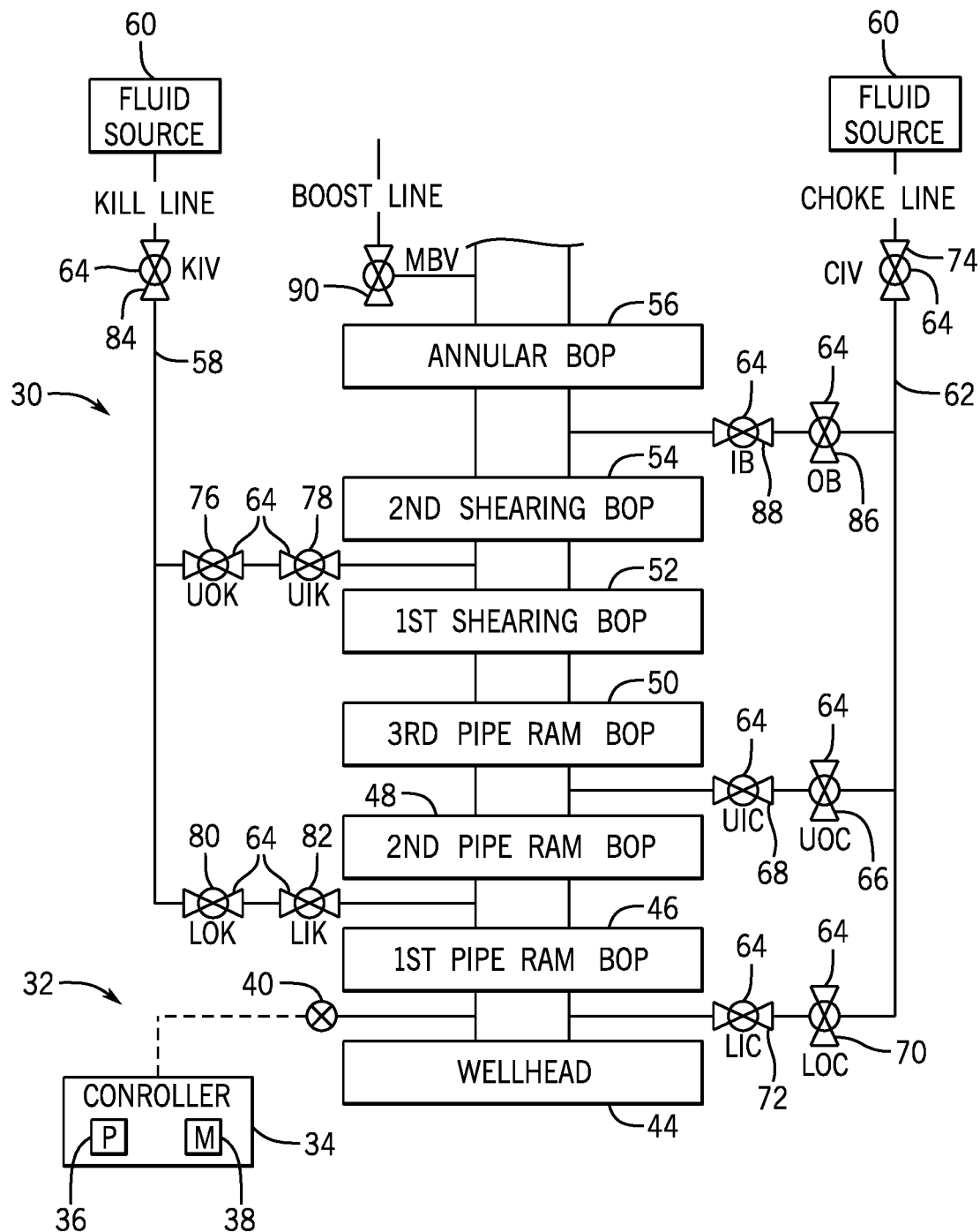
FIG. 4 is a schematic of an embodiment of the improved BOP health monitoring system included in a BOP system or stack, in accordance with an embodiment of the present disclosure.

For example, FIG. 4 is a schematic of a test configuration of a BOP stack 30 that includes a BOP health monitoring system 32, in accordance with embodiments of the present disclosure. As shown in the illustrated embodiment of FIG. 4, the BOP health monitoring system 32 may include a controller 34 that is communicatively coupled to various components of the BOP stack 30. The controller 34 includes a processor 36 configured to execute one or more instructions stored on a memory device 38 of the controller 34. For example, the memory device 38 stores instructions configured to receive feedback (e.g., pressure data, temperature data and/or a status of the components of the BOP stack 30) from a sensor 40 and/or another suitable device (e.g., another sensor and/or another controller). The one or more instructions stored on the memory device 38 may be executed by the processor 36 in order to analyze the feedback and determine the health indices set forth above.

As shown in the illustrated embodiment, the sensor 40 is positioned between a wellhead 44 and the BOP stack 30. In other embodiments, the sensor 40 may be positioned in another suitable location within the BOP stack. The BOP stack 30 illustrated in FIG. 4 includes a variety of components that are utilized to perform pressure tests and/or to block a fluid flow from the wellhead 44 toward a surface, rig, and/or platform of the mineral extraction system. For example, the BOP stack 30 includes a first pipe ram BOP 46, a second pipe ram BOP 48, a third pipe ram BOP 50, a first shearing BOP 52, a second shearing BOP 54, and/or an annular BOP 56. In other embodiments, the BOP stack 30 may include any suitable number and/or types of BOPs. Further, the BOP stack 30 includes a kill line 58 that may be configured to supply pressurized fluid from a fluid source 60 to the BOP stack 30 to perform the pressure tests. The BOP stack 30 may also include a choke line 62 that is configured to direct pressurized fluid from the BOP stack 30 back toward the fluid source 60. In other embodiments, the pressurized fluid may be supplied by the choke line 62 and directed back toward the fluid source 60 via the kill line 58. In still further embodiments, the kill line 58 or the choke line 62 may act alone to both supply the pressurized fluid to the BOP stack 30 and direct the pressurized fluid back to the fluid source 60.

As shown in the illustrated embodiment of FIG. 4, the BOP stack 30 may include a plurality of valves 64 fluidly coupling the kill line 58, components of the BOP stack 30, and the choke line 62 to one another. A position of the plurality of valves 64 may be adjusted based on control signals from the controller 34. As should be understood, the respective positions of each valve of the plurality of valves 64 may determine which components of the BOP stack 30 are tested during a given pressure test. Accordingly, the controller 34 may open and/or close various valves of the plurality of valves 64 to test specific components of the BOP stack 30 to determine a health of the specific components. As shown in the illustrated embodiment of FIG. 4, the BOP stack 30 includes an upper outer choke (UOC) valve 66, an upper inner choke (UIC) valve 68, a lower outer choke (LOC) valve 70, a lower inner choke (LIC) valve 72, a choke isolation valve (CIV) 74, an upper outer kill (UOK) valve 76, an upper inner kill (UIK) valve 78, a lower outer kill (LOK) valve 80, a lower inner kill (LIK) valve 82, a kill isolation valve (KIV) 84, an outer gas bleed (OB) valve 86, an inner gas bleed (IB) valve 88, and/or a mud boost valve (MBV) 90. In other embodiments, the BOP stack 30 may include additional or fewer valves. Further, the plurality of valves 64 may include any suitable type of valve, such as ball valves, butterfly valves, choke valves, solenoid valves, another suitable type of valve, or any combination thereof.

FIG. 5 is a table illustrating an example of an embodiment of the pressure test configuration for the BOP stack 30 of FIG. 4 (e.g., a perpendicular position of a valve of the plurality of valves 64 indicates that the valve is in a closed position). In the pressure test configuration shown in FIGS. 4 and 5, the annular BOP 56, the OB valve 86, the UOC valve 66, and the LOC valve 70 are tested via pressurized fluid supplied from the kill line 58. In FIG. 5, the abbreviated terms utilized above for the plurality of valves 62 are listed for reference. The numerals "0" and "1" indicate the open and closed state for components, respectively.

By investigating the pressurized area from the pressure source to the blocked or closed valves, the BOP health monitoring system 32 enables pressurized areas to be identified, thereby identifying the tested components of the BOP stack 30. For example, when a test pressure is run into the BOP stack 30, using known gate logic, the pressurized and/or non-pressurized status of any given area or component of the BOP stack 30 may be ascertained and recorded. In some embodiments, additional components or situations may be tested, such as 1) a specific side of a valve of the plurality of valves 64 (e.g., most valves have two sides) 2) a specific BOP, 3) one of a pair (inner and outer) of valves of the plurality of valves 64 (e.g., the inner valve is closed and tested, while the outer valve may be open), 4) a directional resistance in pressure of a specific BOP (i.e., a side of the BOP incurring pressure coming from the wellbore). In some cases, a position and/or status of certain components may be irrelevant to a given test, which may enable the BOP health monitoring system 32 to perform the tests independently of such components. For example, a position of the (MBV) 90 does not affect the results of a pressure test when pressurized fluid is supplied via the kill line 58 because the MBV 90 is physically separate from the possible flow paths of the pressurized fluid. Therefore, the BOP health monitoring system 32 may determine that such component is to be "ignored" and indicate that such component may be in either the open or the closed position during the pressure test.

Table 1 below represents an example test configuration under practical constraints derived from an automated pressure test configuration identified by the BOP health monitoring system 32. A compilation of each pressure test configuration may help optimize the planning of BOP pressure tests to reduce an amount of pressure tests performed to test each component. The set of all the test configuration generated by the BOP health monitoring system 32 may be considered a proposed set, and if an actual configuration is not within the set, an operator may flag a warning (e.g., by indicating HI=−1). The coding system of the test configurations may determine which components are tested and/or ignorable. For example, in Table 1 below the numeral "0" represents a component in open position (e.g., a component not being tested and in the open position in order to perform the pressure test), an "X" represents an ignorable component (e.g., a component which may be in the open position or the closed position), and a "T" represents a tested component (e.g., a component in a closed position and undergoing the pressure test). The encoding is in the order of the annular BOP 56, the second shearing BOP 54, the first shearing BOP 52, the third pipe ram BOP 50, the second pipe ram BOP 48, the first pipe ram BOP 46, the UOC valve 66, the UIC valve 68, the LOC valve 70, the LIC valve 72, the CIV 74, the UOK valve 76, the UIK valve 78, the LOK valve 80, the LIK valve 82, the KIV 84, the OB valve 86, the IB valve 88, and the MBV 90.

TABLE 1

| | Component Number | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Test Status | Open | Close | Close | Open | Open | Open | Close | Open | Open | Close | Close | Close | Open | Open | Open | Open | Close | Close | Close |
| Configuration Encode | 0 | T | X | 0 | 0 | X | X | 0 | 0 | T | X | X | 0 | X | X | 0 | T | X | X |

After completion of a pressure test, the extracted configuration may be looked up in the test configuration dictionary or input into the simulator to identify tested components. Further, data collected during the pressure test may be utilized to generate feature values and health indices of the tested components (e.g., via the controller 34), as set forth above. If there is a discrepancy between extracted configurations and expected or stored configurations (e.g., a nonmatching configuration), either the test may have been performed incorrectly or the test configuration dictionary may not be complete or is lacking a test configuration. In the event the dictionary is incomplete, the test record for the performed pressure test may be given a health index HI=−1, to differentiate it from the normal nonnegative range of health indices and warn the operator.

Further, blind spots may exist in various pressure tests that arise from a lack of sensors for a given BOP stack. These blind spots may relate to various components of a given BOP stack configuration that may not be tested. For instance, if the pressured fluid is supplied to the BOP stack via the kill line 58, returned to the fluid source via the choke line 62, and all outer valves are closed (e.g., the UOC valve 66, the LOC valve 70, the UOK valve 76, and/or the LOK valve 80), then the increased pressure does not reach the sensor 40, and thus there is no active pressure change detected by the sensor 40. In such case, the BOP health monitoring system 32 may issue a visual warning (e.g., a notification on a computing device, a flashing light emitting diode (LED), and/or another suitable warning) to the operator so these blind spots can be identified and such pressure tests removed from the target test configuration plan.

The automated configuration analysis of the BOP health monitoring system 32 enables the BOP health monitoring system 32 to apply the method to a variety of BOP structures and to efficiently plan pressure tests as a cost saving measure in operations of a mineral extraction system. Using the disclosed automation, operators may perform grid-searching of all the test configurations or adopt a Monte Carlo approach to cover all the components to be tested, while reducing the number of tests and reducing costs.

In some embodiments, pressure data measured along the choke line 62, the kill line 58, and/or additional wellbore locations might also be used to detect additional pressure tests configurations in addition to pressure data received from the sensor 40.

Further, a duration of an increase in pressure that initiates a seal pressure hold of a given component may be utilized as an indication of elastomer wear. For example, the duration may increase as the component is used over time and indicate performance loss from the original level because less elastomer volume may be present in the component. As such, this duration may also be used in evaluating an overall health of the BOP stack 30 and/or individual components of the BOP stack 30.

In some embodiments, after a pressure test, certain investigative or analytical steps may be undertaken to isolate or identify specific unhealthy or worn BOP components (e.g., components having a health index value greater than a threshold value, such as 10, 15, 25, 50, or another suitable value). Such steps may include, anomaly-detection, fault-detection, fault-prediction, or a remaining useful life (RUL) estimation. Depending on the diagnosis, one or any combination of these steps may be performed to determine that a component of the BOP stack 30 is in a faulty or worn condition. To determine which, if any, of the steps to perform, the BOP health monitoring system 32 may utilize one or more decision algorithms based on the results of the pressure test. For example, the BOP health monitoring system 32 may perform a test penalty algorithm, a drill-down decision tree algorithm, a feature-based exclusion algorithm, or any combination thereof.

The test penalty algorithm may assign a fraction (e.g., a percentage) of pressure test results (e.g., a healthy or unhealthy health index) to each tested component of the pressure test. For instance, the fraction of the pressure test results assigned to each tested component may be an equal amount. In other embodiments, the fraction of the pressure test may be weighted based on various characteristics of the tested components (e.g., pressure rating, known physical condition). Increased fractions assigned to a tested component may enable the BOP health monitoring system 32 to determine which tested component of a respective pressure test resulted in an unhealthy health index.

Figure 6:
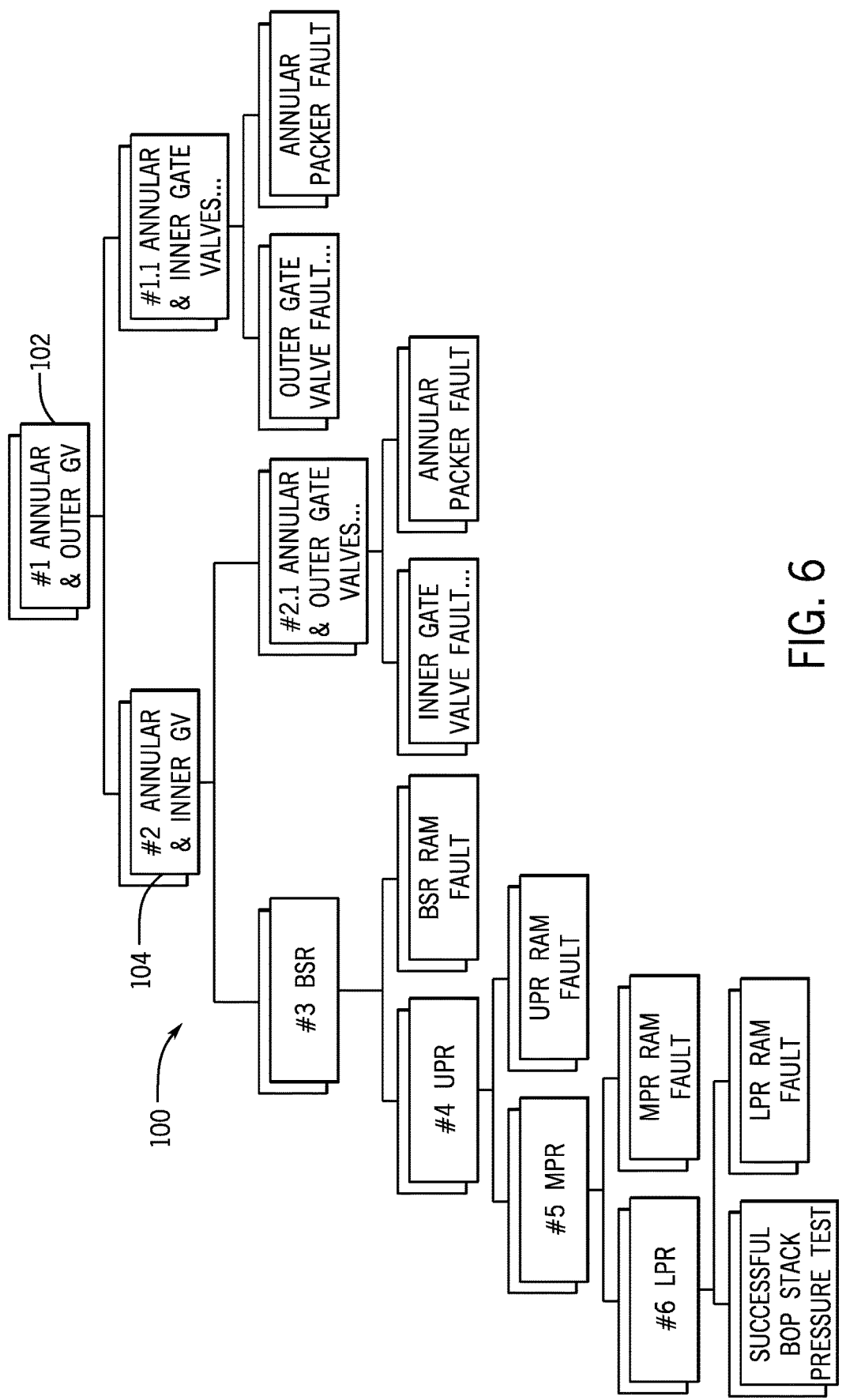
FIG. 6 is a flow chart of an embodiment of a decision tree executed by the improved BOP health monitoring system, in accordance with an embodiment of the present disclosure.

FIG. 6 is a flow chart of an embodiment of the drill-down decision tree algorithm 100. To perform the drill-down decision tree algorithm 100, the BOP health monitoring system 32 may alter a target test configuration plan to determine which component of the BOP stack 30 may be worn or subject to a fault. For instance, the BOP health monitoring system 32 may alter the target test configuration plan for the BOP stack 30 in order to perform additional tests that may isolate a component that may be worn or in need of maintenance. As shown in the illustrated embodiment of FIG. 6, the BOP health monitoring system 32 may perform a first pressure test 102 to begin the target test configuration plan of the BOP stack 30. In some embodiments, the first pressure test 102 may test two components of the BOP stack 30 (e.g., the annular BOP 56 and one of the UOC valve 66, LOC valve 70, UOK valve 76, and/or the LOK valve 80). After the pressure test results are determined, the BOP health monitoring system 32 may perform additional tests to isolate one of the two tested components (e.g., when the pressure test results indicate an unhealthy health index) and/or continue with a second pressure test 104 of the target test configuration plan that tests additional components of the BOP stack 30 (e.g., when the pressure test results indicate a healthy health index).

As such, the drill-down decision tree algorithm may be configured to perform additional pressure tests that would otherwise not be performed by the target test configuration plan of the BOP health monitoring system 32. These additional pressure tests may isolate a specific component to determine that the specific component has incurred wear and/or a fault. When the pressure test results of a respective pressure test indicate that the tested components have a healthy health index (e.g., a health index less than a threshold, such as 5, 10, 15, 25, 50, or another suitable value), the BOP health monitoring system 32 may continue to test additional components of the BOP stack 30 in accordance with the target test configuration plan generated for the particular structure of the BOP stack 30.

Further, the BOP health monitoring system 32 may perform a feature based exclusion algorithm to determine a specific component of the BOP stack 30 that has generated an unhealthy health index. For example, the feature based exclusion algorithm may utilize feedback from the sensor 40 and/or another sensor included in the BOP stack 30. The BOP health monitoring system 32 may utilize pressure and/or temperature profiles over time and associate the profiles with a specific class of components of the BOP stack 30 (e.g., a valve of the plurality of valves 36, a BOP sealing element). Accordingly, upon determining that a pressure test results in an unhealthy health index, the BOP health monitoring system 32 may use signal-driven or model-driven classification methods to analyze the profile of the feedback from the sensor 40, or another suitable sensor, to determine which type or class of component may have resulted in the unhealthy health index. Further, the BOP health monitoring system may then modify the target test configuration plan of the BOP stack 30 to isolate and identify a specific component from the class and/or type of component identified.

In some embodiments, multiple types of health-indicators (e.g., health indices) may be tracked at different component levels of the BOP stack 30, such as the BOP stack 30 generally, a component class or type of the BOP stack 30 (e.g., one or more valves of the plurality of valves 64 and/or BOPs), and individual components of the BOP stack 30. For example, while the BOP health monitoring system 30 may provide a health index for the BOP stack 30 generally, the BOP health monitoring system 30 may be configured to provide class health indices and/or individual component health indices by performing the algorithms that diagnose classes and/or individual components of the BOP stack 30 discussed above. Generating more specific health indices enables maintenance procedures to be performed for one or more specific components to ensure a target performance of the BOP stack 30.

In some embodiments, a specific health index for a class of components or an individual component of the BOP stack 30 may be tagged with additional information such as an anticipated condition of the class of components or individual component of the BOP stack 30, estimated remaining useful life (RUL) of the class of components or individual component of the BOP stack 30, and/or a confidence level of a condition of the class of components or specific component of the BOP stack 30. This information may be provided to operators, such that informed decisions on maintenance may be made to reduce a non-production time of a mineral extraction system. Health indices and/or other additional information may be transmitted directly between the BOP health monitoring system (e.g., the controller 34) and a Computerized Maintenance Management System (CMMS) of the mineral extraction system having the BOP stack 30. Therefore, an operator may determine when maintenance should be performed while also considering other operational, logistical, and administrative constraints of the mineral extraction system.

Figure 7:
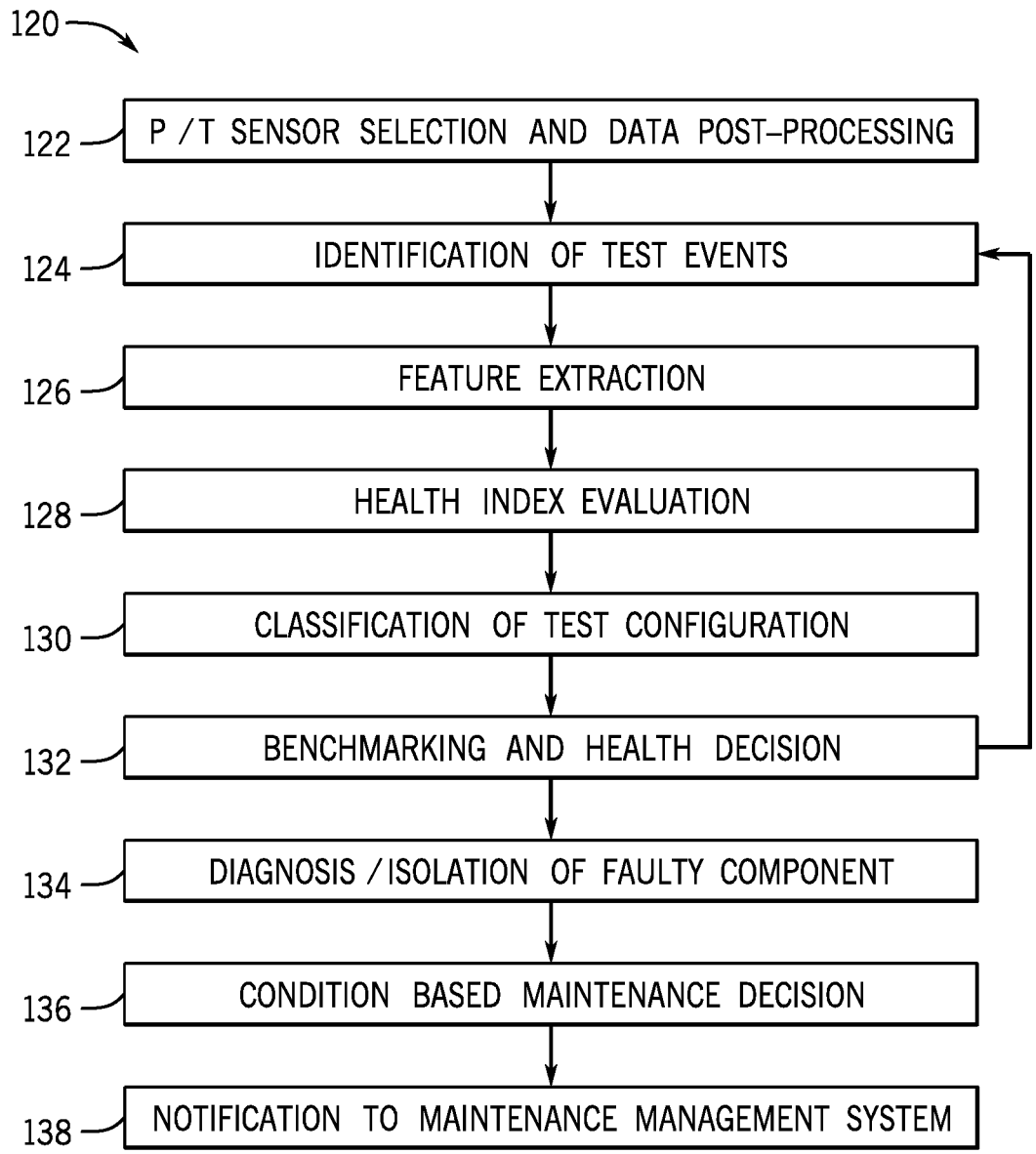
FIG. 7 is a flow chart of an embodiment of a process performed by the improved BOP health monitoring system, in accordance with an embodiment of the present disclosure.

FIG. 7 is a block diagram of an embodiment of a process 120 performed by the BOP health monitoring system 32 to diagnose the health of the BOP stack 30. The process 120 may be stored as one or more instructions on the memory 38 and configured to be executed by the processor 36 of the controller 34 of the BOP health monitoring system 32. As shown in the illustrated embodiment of FIG. 7, at block 122, the processor 36 may receive feedback from the sensor 40 indicative of a pressure at a location within the BOP stack 30 over time. At block 124, the processor 36 may identify individual pressure tests from the feedback and filter out any data that is not associated with a pressure test (e.g., data points between individual pressure tests, data points identified as noise, among others). Accordingly, at block 126, the processor 36 identifies feature characteristics of the data. As set forth above, the feature characteristics of the data may include a decay of a respective pressure test (e.g., a slope between a starting point of a pressure test and an ending point of a pressure test) and/or a hold duration of the respective pressure test (e.g., a duration at which an increased pressure was maintained in the BOP stack 30). The processor 36 may then determine the health index based on the feature characteristics using Equations 1, 2, 3, and/or 4 set forth above, as shown at block 128.

Upon determination of the health index for the respective pressure test or tests, the processor 36 may determine which components of the BOP stack 30 were tested, as shown at block 130. As set forth above, such a determination may be made based on information corresponding to a target test configuration plan of the BOP stack 30 and/or using another suitable technique. Based on the health index determined at block 128, the processor 36 may determine whether to continue with a target test plan to test additional components and/or to modify the test plan to identify a component that may have generated an unhealthy health index, as shown at block 132. For example, when the processor 36 generates a healthy health index at block 128, the processor 36 may return to block 124 and/or block 122 to run another pressure test consistent with the target test plan that tests additional components of the BOP stack 130. When the processor 36 generates an unhealthy health index at block 128, the processor 36 may proceed to block 134 to determine and/or identify a specific component of the BOP stack 130 that may have caused the unhealthy health index.

When the processor 36 proceeds to block 134 based on a determination of an unhealthy health index, the processor 36 may perform the test penalty algorithm, the drill-down decision tree algorithm, the feature based exclusion algorithm, or any combination thereof, to identify the specific component of the BOP stack 30, as shown at block 136. As such, the processor 36 may modify the target test configuration plan to perform additional tests that isolate specific components of the BOP stack 30 to determine which tested component may have caused the unhealthy health index. Further, upon identification of the specific component of the BOP stack 30 that caused the unhealthy health index, the processor 36 may output a signal (e.g., a notification to a computing device and/or a blinking LED) to alert an operator that maintenance may be performed on the specific component, as shown at block 138.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The invention claimed is:

1. A blowout preventer (BOP) health monitoring system, comprising:
 a controller having a tangible, machine readable-medium storing one or more instructions executable by a processor, wherein the one or more instructions are configured to:
  receive feedback from a sensor, wherein the feedback is indicative of a pressure within a BOP stack over time;
  determine a position of a plurality of components of the BOP stack;
  determine a start point and an end point of a pressure test based on the feedback;
  determine a decay and a hold duration of the pressure test based on the feedback, the start point, and the end point;
  determine a health index of the BOP stack based on the decay and the hold duration; and
  provide an output indicative of a condition of the BOP stack based on the health index.

2. The system of claim 1, wherein the one or more instructions are configured to determine one or more components of the plurality of components of the BOP stack being tested by the pressure test based on the position of the plurality of components of the BOP stack.

3. The system of claim 2, wherein the one or more instructions are configured to modify a target test configuration plan of the BOP stack when the health index exceeds a threshold value.

4. The system of claim 3, wherein the one or more instructions are configured to modify the target test configuration plan by performing a second pressure test that isolates a component of the one or more components to determine a second health index indicative of wear incurred by the component.

5. The system of claim 3, wherein the one or more instructions are configured to generate the target test configuration plan of the BOP health monitoring system based on a structure of the BOP stack, the plurality of components of the BOP stack, a flow path of pressurized fluid directed toward and away from the BOP stack, or any combination thereof.

6. The system of claim 5, wherein the target test configuration plan of the BOP health monitoring system is configured to minimize a total number of pressure tests performed to test each of the component of the plurality of components of the BOP stack.

7. The system of claim 6, wherein the one or more instructions are configured to eliminate pressure tests from the target test configuration plan that do not test any component of the plurality of components of the BOP stack.

8. The system of claim 5, wherein the one or more instructions are configured to generate a matrix for each pressure test of the target test configuration plan that identifies tested components of the plurality of components, non-tested components of the plurality of components, and extraneous components of the plurality of components for each pressure test of the target test configuration plan.

9. The system of claim 1, wherein the feedback from the sensor is indicative of the pressure within an annulus of the BOP stack.

10. The system of claim 1, wherein the one or more instructions are configured to determine the health index of the BOP stack via a comparison between the decay and a decay threshold, a comparison between the hold duration and a hold duration threshold, or both.

11. The system of claim 1, wherein the output indicative of a condition of the BOP stack based on the health index comprises suggested timing for performing maintenance on or performing troubleshooting of the BOP stack.

12. A system, comprising:
 a blowout preventer (BOP) stack comprising one or more valves and a BOP;
 a sensor configured to monitor a pressure within the BOP stack; and
 a BOP health monitoring system comprising a controller having a tangible, machine readable-medium storing one or more instructions executable by a processor, wherein the one or more instructions are configured to:
  receive feedback from the sensor, wherein the feedback is indicative of a pressure within the BOP stack over time;
  determine a start point and an end point of a pressure test based on the feedback;
  determine a decay and a hold duration of the pressure test based on the feedback, the start point, and the end point;
  determine a health index of the BOP stack based on the decay and the hold duration; and
  provide an output indicative of a condition of the BOP stack based on the health index.

13. The system of claim 12, wherein the one or more instructions are configured to filter the feedback to reduce noise, erroneous data, or both.

14. The system of claim 12, wherein the one or more instructions are configured to interpolate the feedback to determine a local decay of the pressure test.

15. The system of claim 14, wherein the one or more instructions are configured to further determine the health index based on the local decay.

16. The system of claim 12, wherein the one or more instructions are configured to generate a target test configuration plan of the BOP health monitoring system based on a structure of the BOP stack, components included in the BOP stack, a flow path of pressurized fluid directed toward and away from the BOP stack, or any combination thereof.

17. A method, comprising:
 receiving feedback from a sensor indicative of a pressure within a BOP stack over time;
 determining a start point and an end point of a pressure test based on the feedback;
 determining a decay and a hold duration of the pressure test based on the feedback, the start point, and the end point;
 determining a health index of the BOP stack based on the decay and the hold duration; and
 providing an output indicative of a condition of the BOP stack based on the health index.

18. The method of claim 17, comprising receiving second feedback indicative of a position of a plurality of components of the BOP stack and determining one or more components of the plurality of components of the BOP stack that are being tested by the pressure test based on the second feedback.

19. The method of claim 18, comprising modifying a target test configuration plan of the BOP stack when the health index exceeds a threshold value.

20. The method of claim 19, wherein modifying the target test configuration plan comprises performing a second pressure test that isolates a component of the one or more components to determine a second health index indicative of wear incurred by the component.

* * * * *